United States Patent
Catherwood et al.

(10) Patent No.: US 8,984,198 B2
(45) Date of Patent: Mar. 17, 2015

(54) DATA SPACE ARBITER

(75) Inventors: Michael I. Catherwood, Georgetown, TX (US); Ashish Desai, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 484 days.

(21) Appl. No.: 12/818,325

(22) Filed: Jun. 18, 2010

(65) Prior Publication Data

US 2011/0022756 A1 Jan. 27, 2011

Related U.S. Application Data

(60) Provisional application No. 61/227,147, filed on Jul. 21, 2009.

(51) Int. Cl.
*G06F 13/36* (2006.01)
*G06F 13/16* (2006.01)
*G06F 13/362* (2006.01)

(52) U.S. Cl.
CPC .......... *G06F 13/1605* (2013.01); *G06F 13/362* (2013.01)
USPC ....................................................... 710/116

(58) Field of Classification Search
USPC .................................. 710/113–125, 240–244
See application file for complete search history.

(56) References Cited

U.S. PATENT DOCUMENTS

| | | | | |
|---|---|---|---|---|
| 3,913,070 A | * | 10/1975 | Malcolm et al. | 718/104 |
| 4,115,855 A | * | 9/1978 | Chiba | 711/158 |
| 4,395,753 A | * | 7/1983 | Comfort et al. | 710/120 |
| 4,493,036 A | * | 1/1985 | Boudreau et al. | 710/244 |
| 4,785,394 A | * | 11/1988 | Fischer | 710/114 |
| 5,151,994 A | * | 9/1992 | Wille et al. | 710/116 |
| 5,191,653 A | * | 3/1993 | Banks et al. | 710/113 |
| 5,301,283 A | * | 4/1994 | Thacker et al. | 710/116 |
| 5,440,752 A | * | 8/1995 | Lentz et al. | 710/123 |
| 5,506,989 A | * | 4/1996 | Boldt et al. | 710/244 |
| 5,535,202 A | * | 7/1996 | Kondoh | 370/395.7 |
| 5,546,548 A | * | 8/1996 | Chen et al. | 710/116 |
| 5,553,310 A | | 9/1996 | Taylor et al. | 395/860 |
| 5,572,686 A | * | 11/1996 | Nunziata et al. | 710/116 |
| 5,761,445 A | * | 6/1998 | Nguyen | 710/100 |

(Continued)

FOREIGN PATENT DOCUMENTS

CN 1261865 C 6/2006 ............. G06F 12/00

OTHER PUBLICATIONS

International Search Report and Written Opinion for Application No. PCT/US2010/042525 (11 pages), Nov. 5, 2010.

(Continued)

*Primary Examiner* — Paul R Myers
(74) *Attorney, Agent, or Firm* — King & Spalding L.L.P.

(57) ABSTRACT

A digital processor has a default bus master having a highest priority in a default mode, a plurality of secondary bus masters having associated priorities, wherein the plurality of secondary bus masters have a predetermined priority relationship to each other, and a data space arbiter. The data space arbiter is programmable in a non-default mode to raise a priority of any of the secondary bus masters to have a priority higher than the priority of the default bus master while maintaining the predetermined priority relationship to only those secondary bus masters for which the priority level also has been raised above the priority of the default bus master.

21 Claims, 13 Drawing Sheets

(56) References Cited

U.S. PATENT DOCUMENTS

| | | | | |
|---|---|---|---|---|
| 5,862,355 A * | 1/1999 | Logsdon | | 710/116 |
| 5,884,051 A * | 3/1999 | Schaffer et al. | | 710/107 |
| 5,907,689 A * | 5/1999 | Tavallaei et al. | | 710/110 |
| 6,026,459 A * | 2/2000 | Huppenthal | | 710/116 |
| 6,052,738 A | 4/2000 | Muller et al. | | 709/250 |
| 6,272,580 B1 | 8/2001 | Stevens et al. | | 710/116 |
| 6,286,070 B1 * | 9/2001 | Ohara | | 710/113 |
| 6,295,553 B1 * | 9/2001 | Gilbertson et al. | | 709/207 |
| 6,411,236 B1 * | 6/2002 | Kermani | | 341/141 |
| 6,430,641 B1 * | 8/2002 | Hofmann et al. | | 710/240 |
| 6,438,635 B1 * | 8/2002 | Date et al. | | 710/113 |
| 6,651,148 B2 * | 11/2003 | Widdup | | 711/158 |
| 6,654,837 B1 * | 11/2003 | Hill et al. | | 710/200 |
| 6,665,760 B1 * | 12/2003 | Dotson | | 710/240 |
| 6,704,821 B2 * | 3/2004 | Scandurra et al. | | 710/243 |
| 6,798,750 B1 * | 9/2004 | Langgartner | | 370/252 |
| 6,996,684 B2 * | 2/2006 | Tseng et al. | | 711/151 |
| 7,039,737 B1 | 5/2006 | Dorr et al. | | 710/240 |
| 7,054,330 B1 * | 5/2006 | Chou et al. | | 370/462 |
| 7,093,045 B2 * | 8/2006 | Yamamoto | | 710/116 |
| 7,380,038 B2 * | 5/2008 | Gray | | 710/243 |
| 2004/0103232 A1 * | 5/2004 | Clayton | | 710/244 |
| 2004/0143710 A1 * | 7/2004 | Walmsley | | 711/144 |
| 2009/0217280 A1 * | 8/2009 | Miller et al. | | 718/104 |

OTHER PUBLICATIONS

Chinese Office Action, Application No. 201080024326.8, 34 pages, Mar. 4, 2014.

Chinese Office Action, Application No. 201080024326.8, 33 pages, Aug. 20, 2014.

* cited by examiner

| MSTRPR<15:0> | 0x0000 | 0x0002 | 0x0008 | 0x0020 | 0x000A | 0x0022 | 0x0028 | 0x002A |
|---|---|---|---|---|---|---|---|---|
| Bus Master Priority in Arbiter | Default | Ethernet ◄ | USB ◄ | DMA ◄ | Ethernet+ USB ◄ | Ethernet+ DMA ◄ | USB+DMA ◄ | Ethernet+ USB+DMA ◄ |
| 1 (highest) | CPU (M0) | Ethernet | USB | DMA | Ethernet | Ethernet | USB | Ethernet |
| 2 | Ethernet (M1) | CPU | CPU | CPU | USB | DMA | DMA | USB |
| 3 | USB (M2) | USB | Ethernet | Ethernet | CPU | CPU | CPU | DMA |
| 4 | DMA (M3) | DMA | DMA | USB | DMA | USB | Ethernet | CPU |
| 5 (lowest) | ICD (M4) | ICD | ICD | ICD | ICD | ICD | ICD | ICD |

*Figure 2*

| MSTRPR<7:0> cpu_arb_master_priority<7:0> (see text) | | REQUEST[1] | | | | GRANT | | | | BUS SELECTED (NEXT CYCLE) |
|---|---|---|---|---|---|---|---|---|---|---|
| | | CPU (M0) | USB (M1) | DMAC (M2) | ICD (M3) | CPU (M0) | USB (M1) | DMAC (M2) | ICD (M3) | |
| 0x00 | CPU HIGHEST PRIORITY (DEFAULT) | 0 | 0 | 0 | 0 | 0 | 0 | 0 | 0 | CPU[2] |
| 0x00 | | 0 | 0 | 0 | 1 | 0 | 0 | 0 | 1 | ICD |
| 0x00 | | 0 | 0 | 1 | 0 | 0 | 0 | 1 | 0 | DMAC |
| 0x00 | | 0 | 0 | 1 | 1 | 0 | 0 | 1 | 0 | DMAC |
| 0x00 | | 0 | 1 | 0 | 0 | 0 | 1 | 0 | 0 | USB |
| 0x00 | | 0 | 1 | 0 | 1 | 0 | 1 | 0 | 0 | USB |
| 0x00 | | 0 | 1 | 1 | 0 | 0 | 1 | 0 | 0 | USB |
| 0x00 | | 0 | 1 | 1 | 1 | 0 | 1 | 0 | 0 | USB |
| 0x00 | | 1 | 0 | 0 | 0 | 1 | 0 | 0 | 0 | CPU |
| 0x00 | | 1 | 0 | 0 | 1 | 1 | 0 | 0 | 0 | CPU |
| 0x00 | | 1 | 0 | 1 | 0 | 1 | 0 | 0 | 0 | CPU |
| 0x00 | | 1 | 0 | 1 | 1 | 1 | 0 | 0 | 0 | CPU |
| 0x00 | | 1 | 1 | 0 | 0 | 1 | 0 | 0 | 0 | CPU |
| 0x00 | | 1 | 1 | 0 | 1 | 1 | 0 | 0 | 0 | CPU |
| 0x00 | | 1 | 1 | 1 | 0 | 1 | 0 | 0 | 0 | CPU |
| 0x00 | | 1 | 1 | 1 | 1 | 1 | 0 | 0 | 0 | CPU |

FROM FIG. 9A

| | | | | | | | | | |
|---|---|---|---|---|---|---|---|---|---|
| 0x08 | 0 | 0 | 0 | 0 | 0 | 0 | 0 | 0 | CPU² |
| 0x08 | 0 | 0 | 0 | 1 | 0 | 0 | 1 | 1 | ICD |
| 0x08 | 0 | 0 | 0 | 0 | 0 | 1 | 0 | 0 | DMAC |
| 0x08 | 0 | 0 | 0 | 1 | 1 | 1 | 1 | 0 | DMAC |
| 0x08 | 0 | 0 | 1 | 0 | 1 | 0 | 0 | 0 | USB |
| 0x08 | 0 | 0 | 1 | 1 | 0 | 0 | 0 | 0 | USB |
| 0x08 | 0 | 0 | 1 | 0 | 0 | 1 | 0 | 0 | USB |
| 0x08 | 1 | 0 | 1 | 1 | 1 | 0 | 0 | 0 | USB |
| 0x08 | 1 | 1 | 0 | 0 | 1 | 0 | 0 | 0 | CPU |
| 0x08 | 1 | 1 | 1 | 1 | 0 | 0 | 0 | 0 | CPU |
| 0x08 | 1 | 0 | 0 | 0 | 1 | 0 | 0 | 0 | CPU |
| 0x08 | 1 | 1 | 1 | 1 | 0 | 1 | 0 | 0 | CPU |
| 0x08 | 0 | 0 | 0 | 0 | 1 | 1 | 0 | 0 | USB |
| 0x08 | 1 | 1 | 0 | 1 | 1 | 1 | 0 | 0 | USB |
| 0x08 | 1 | 1 | 1 | 1 | 1 | 1 | 0 | 0 | USB |
| 0x08 | 1 | 1 | 1 | 1 | 1 | 1 | 0 | 0 | USB |

RAISE USB PRIORITY

*Figure 9B*

| MSTRPR<7:0> cpu_arb_master_priority<7:0> (see text) | REQUEST[1] | | | | GRANT | | | | BUS SELECTED (NEXT CYCLE) |
|---|---|---|---|---|---|---|---|---|---|
| | CPU (M0) | USB (M1) | DMAC (M2) | ICD (M3) | CPU (M0) | USB (M1) | DMAC (M2) | ICD (M3) | |
| 0x20 | 0 | 0 | 0 | 0 | 0 | 0 | 0 | 0 | CPU[2] |
| 0x20 | 0 | 0 | 0 | 1 | 0 | 0 | 0 | 1 | ICD |
| 0x20 | 0 | 0 | 1 | 0 | 0 | 0 | 1 | 0 | DMAC |
| 0x20 | 0 | 0 | 1 | 1 | 0 | 0 | 1 | 0 | DMAC |
| 0x20 | 0 | 1 | 0 | 0 | 0 | 1 | 0 | 0 | USB |
| 0x20 | 0 | 1 | 0 | 1 | 0 | 1 | 0 | 0 | USB |
| 0x20 | 0 | 1 | 1 | 0 | 0 | 0 | 1 | 0 | DMAC |
| 0x20 | 0 | 1 | 1 | 1 | 0 | 0 | 1 | 0 | DMAC |
| 0x20 | 1 | 0 | 0 | 0 | 1 | 0 | 0 | 0 | CPU |
| 0x20 | 1 | 0 | 0 | 1 | 1 | 0 | 0 | 0 | CPU |
| 0x20 | 1 | 0 | 1 | 0 | 0 | 0 | 1 | 0 | DMAC |
| 0x20 | 1 | 0 | 1 | 1 | 0 | 0 | 1 | 0 | DMAC |
| 0x20 | 1 | 1 | 0 | 0 | 1 | 0 | 0 | 0 | CPU |
| 0x20 | 1 | 1 | 0 | 1 | 1 | 0 | 0 | 0 | CPU |
| 0x20 | 1 | 1 | 1 | 0 | 0 | 0 | 1 | 0 | DMAC |
| 0x20 | 1 | 1 | 1 | 1 | 0 | 0 | 1 | 0 | DMAC |

RAISE DMAC PRIORITY

FROM FIG. 10A

| | | | | | | | | | |
|---|---|---|---|---|---|---|---|---|---|
| 0x28 | 0 | 0 | 0 | 0 | 0 | 0 | 0 | 0 | CPU² |
| 0x28 | 0 | 0 | 0 | 0 | 0 | 0 | 0 | 1 | ICD |
| 0x28 | 0 | 0 | 0 | 0 | 1 | 0 | 1 | 0 | DMAC |
| 0x28 | 0 | 0 | 0 | 1 | 1 | 0 | 1 | 0 | DMAC |
| 0x28 | 0 | 0 | 1 | 0 | 0 | 1 | 0 | 0 | USB |
| 0x28 | 0 | 0 | 1 | 1 | 0 | 1 | 0 | 0 | USB |
| 0x28 | 0 | 1 | 0 | 1 | 0 | 1 | 0 | 0 | USB |
| 0x28 | 0 | 1 | 1 | 1 | 0 | 1 | 0 | 0 | USB |
| 0x28 | 1 | 0 | 0 | 0 | 1 | 0 | 0 | 0 | CPU |
| 0x28 | 1 | 0 | 0 | 1 | 1 | 0 | 0 | 0 | CPU |
| 0x28 | 1 | 1 | 0 | 0 | 0 | 1 | 0 | 0 | DMAC |
| 0x28 | 1 | 1 | 1 | 0 | 0 | 1 | 0 | 0 | DMAC |
| 0x28 | 1 | 1 | 0 | 1 | 0 | 0 | 0 | 0 | USB |
| 0x28 | 1 | 1 | 1 | 0 | 0 | 0 | 0 | 0 | USB |
| 0x28 | 1 | 1 | 1 | 1 | 0 | 0 | 0 | 0 | USB |
| 0x28 | 1 | 1 | 1 | 1 | 1 | 0 | 0 | 0 | USB |

RAISE USB + DMAC PRIORITY

*Figure 10B*

DATA SPACE ARBITER

CROSS-REFERENCE TO RELATED APPLICATIONS

This application claims the benefit of U.S. Provisional Application No. 61/227,147 filed on Jul. 21, 2009, entitled "MUTABLE DATA ARBITER PRIORITY CONTROL", which is incorporated herein in its entirety.

TECHNICAL FIELD

The present disclosure relates to digital processors, and, more particularly, to data arbiter priority control systems in a digital processor.

BACKGROUND

In embedded systems using digital processors, e.g., microcontrollers, having a plurality of peripheral devices and a central processing unit (CPU), certain functional units are shared between the CPU and at least some of the peripherals such as a direct memory access (DMA) controller or an in-circuit debug (ICD) controller. Thus, a data space arbiter is used to determine access rights to the memory or special function registers that are shared. In a data space arbiter for a multi-master system, the CPU is typically the highest priority bus master. A typical data space arbiter consists of a priority encoder and a set of data bus multiplexers. A conventional programmable data space arbiter implements the programmability within the priority encoder but uses predetermined priorities in which the CPU generally has the highest priority. Thus, whenever the CPU is accessing the memory all other peripherals usually are stalled. However, in embedded systems it may sometimes just temporarily be more critical to respond to an external event by, for example, a peripheral then to ensure high CPU throughput.

Therefore there exists a need for an improved more flexible data space arbiter.

SUMMARY

According to an embodiment, a digital processor may comprise a default bus master having a highest priority in a default mode; a plurality of secondary bus masters having associated priorities, wherein the plurality of secondary bus masters have a predetermined priority relationship to each other; and a data space arbiter, wherein the data space arbiter is programmable in a non-default mode to raise a priority of any of the secondary bus masters to have a priority higher than the priority of the default bus master while maintaining the predetermined priority relationship to only those secondary bus masters for which the priority level also has been raised above the priority of the default bus master.

According to a further embodiment, the data space arbiter may grant access to data memory and the data memory may comprise at least one of random access memory, dual port memory, special function registers. According to a further embodiment, the digital processor may further comprise a bus master priority register having priority override bits, at least one of the secondary bus masters is assigned to one of the priority override bits, wherein the bus master priority register programmably specifies which ones of the plurality of secondary bus masters have higher or lower priorities than the default bus master priority. According to a further embodiment, setting a priority override bit may cause a priority level of an associated secondary bus master to be raised above the priority level of the default bus master. According to a further embodiment, the data space arbiter may comprise a separate arbiter unit for read and write accesses. According to a further embodiment, the data space arbiter comprises a separate arbiter unit for memory and special function register accesses. According to a further embodiment, the data space arbiter may comprise a separate arbiter unit for memory and special function register accesses. According to a further embodiment, the digital processor may further comprise an address decoder coupled between the data space arbiter and the data memory. According to a further embodiment, the digital processor may further comprise a coarse address decoder coupled between the data space arbiter and the default bus master or secondary bus masters. According to a further embodiment, the digital processor can be a digital signal processor and the random access memory may be split into an X-memory and a Y-memory. According to a further embodiment, the default bus master can be a central processing unit (CPU).

According to another embodiment, a method for arbitrating data space access in a digital processor, may comprise: assigning priorities to a default bus master and a plurality of secondary bus masters wherein the default bus master has the highest priority in a default mode and wherein the plurality of secondary bus masters have a predetermined priority relationship to each other; and programming a data space arbiter in a non-default mode to raise a priority of any of the secondary bus masters to have a priority higher than the priority of the default bus master while maintaining the predetermined priority relationship to only those secondary bus masters for which the priority level also has been raised above the priority of the default bus master.

According to a further embodiment of the method, the method may further comprise: requesting access to a data space by a secondary bus master while the default bus master has access to the data space and if the priority of the secondary bus master is higher than the priority of the default bus master, granting access to the data space other wise stalling the secondary bus master. According to a further embodiment of the method, the data space can be data memory which comprises at least one of random access memory, dual port memory, special function registers. According to a further embodiment of the method, the step of programming a data space arbiter to raise a priority of the secondary bus masters may comprise the step of setting a bit in a bus master priority register. According to a further embodiment of the method, at least one of the secondary bus master may have an associated bit in the bus master priority register. According to a further embodiment of the method, the data space arbiter may comprise a separate arbiter unit for read and write accesses. According to a further embodiment of the method, the data space arbiter may comprise a separate arbiter unit for memory and special function register accesses. According to a further embodiment of the method, the data space arbiter may comprise a separate arbiter unit for memory and special function register accesses.

According to yet another embodiment, a method for arbitrating data space access in a digital processor may comprise: assigning a highest priority to a central processing unit (CPU) and further priorities to a plurality of non-CPU bus masters in a default mode wherein the plurality of non-CPU bus masters have a predetermined fixed priority relationship to each other; programming a data space arbiter by setting a bit in a bus master priority register to raise a priority of one of the non-CPU bus masters to have a priority higher than the priority of the CPU while maintaining the predetermined priority relationship to only those non-CPU bus masters for which the priority level also has been raised above the priority of the CPU; and requesting access to a data space by a bus master while the CPU has access to the data space and if the priority of the bus master is higher than the priority of the CPU, granting access to the data space other wise stalling the bus master, wherein the data space is data memory which comprises at least one of random access memory, dual port memory, special function registers.

BRIEF DESCRIPTION OF THE DRAWINGS

A more complete understanding of the present disclosure and advantages thereof may be acquired by referring to the following description taken in conjunction with the accompanying drawings wherein:

FIG. 2 shows a bus arbiter priority table for several bus masters according to an embodiment;

FIG. 9 shows RAM arbiters timing examples with the CPU not having the highest priority;

FIG. 10 shows a SFR arbiter interconnect block diagram according to an embodiment.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

According to various embodiments, a data space arbiter is designed to allow the priority of any bus master to be raised relative to the priority of the bus master having the highest priority in default mode (hereinafter "default master"), thereby increasing real-time response flexibility in a digital processor system. This can be accomplished in a easy way by maintaining the predetermined priority relationship between the raised bus master and only those bus masters for which the priority level also has been raised above the priority of the default master. Hence, no complicated reassignment of priority levels of each bus master is necessary. According to the teachings of this disclosure, each bus master (except the default master) may opt to override this priority. If the default master is the CPU, any (non-CPU) bus master priority can, thus, be defined, for example, through user defined programmable priority override bits, to be higher or lower than that of the CPU. However, the relative priority of all bus masters within the priority group higher than the default master is designed not to change. Similarly, the relative priority of all bus masters within the priority group lower than the default master does not to change. The incoming bus master requests are simply reordered, for example, by using multiplexers, based on the state of the priority override bits. They are then sent to a simple fixed priority encoder and prioritized as usual. The resulting bus grant signals are then remapped back to their original order, for example, again using the state of the priority override bits, and the winning bus master is granted bus access. All other bus masters are stalled.

Figure 1:
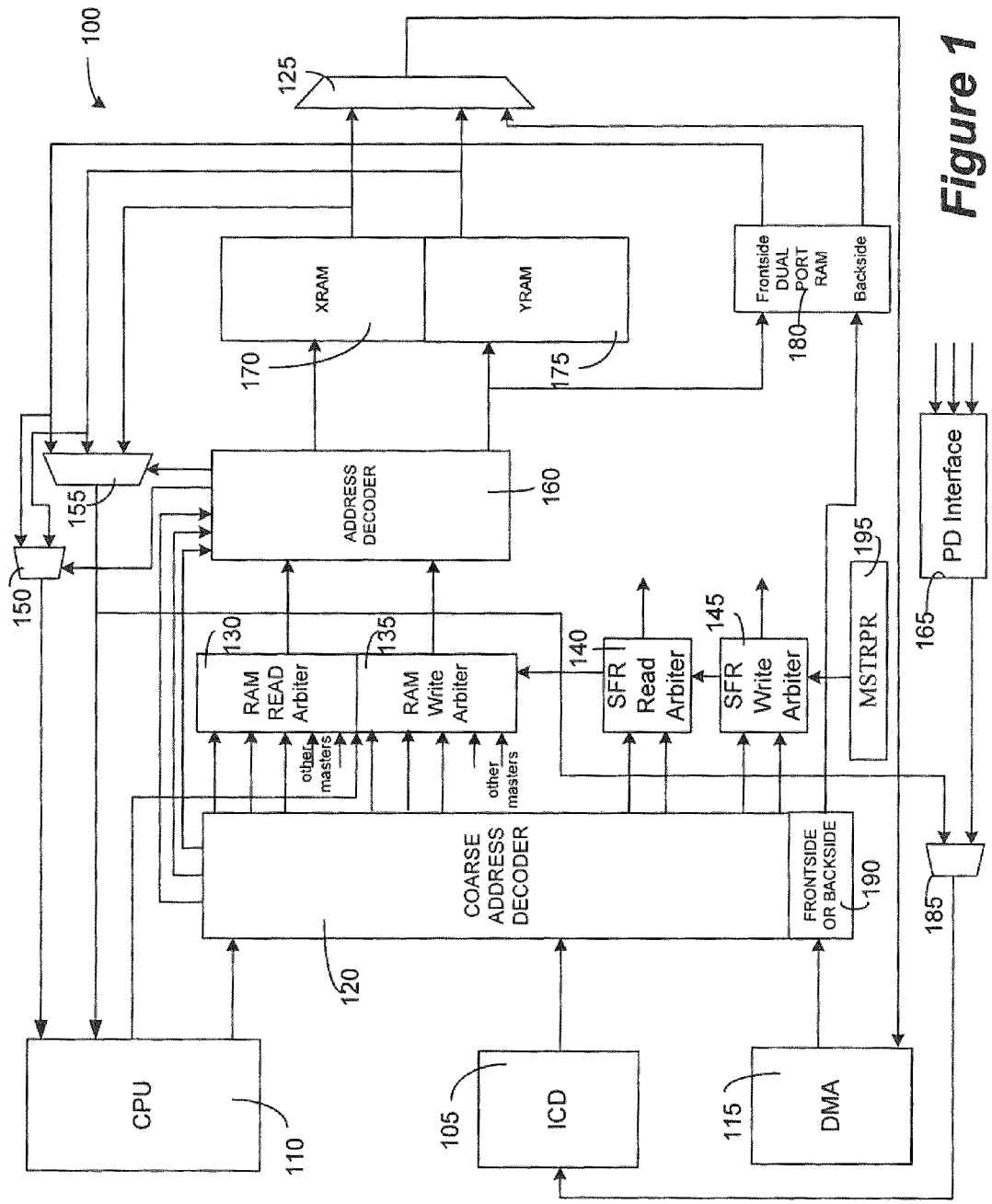
FIG. 1 shows a block diagram of data space arbiters, bus multiplexers and address decoders in a microcontroller system.

FIG. 1 shows a principal block diagram of a digital signal processor 100 with three different bus masters, a CPU 110, an in-circuit debugger (ICD) unit 105 and a direct memory access (DMA) controller 115. However, other configurations with a general purpose processor and different bus masters may apply as will be appreciated by a person skilled in the art. A coarse address decoder 120 is coupled with these bus masters to decide whether a request hits the ransom access memory (RAM) or the special function registers (SFR). This coarse address decoder generates a plurality of output signals which are coupled with respective dedicated read arbiters 130 and 140, and dedicated write arbiters 135 and 145. The RAM arbiters 130, 135 are coupled with a panel level address decoder for accessing two separate static random access memories (SRAM) 170 and 175. In addition, a dual port (DP) SRAM 180 is provided which is on one hand coupled with the output of address decoder 160 and on the other hand with a special coarse address decoder 190 which may be part of or associated with coarse address decoder 120. The outputs of all memory devices 170, 175, and 180 are coupled through various multiplexers 125, 150, 155, and 185 with the different bus masters 110, 105, 115. A peripheral device interface 165 may be coupled directly through multiplexer 185 with ICD unit 105. However, as mentioned above other memory configuration may be used according to various embodiments, for example, a single memory can be used with a general purpose processor.

Also, in this specific embodiment of a digital signal processor or microcontroller, separate arbiters for RAM and SFR are provided. Moreover, within each arbiter separate arbiters or read (130; 140) and write accesses (135; 145) are provided. However, other designs may be used and the number of actual arbiters may vary. For example, a single arbiter may be used to provide the same functionality.

According to various embodiments, the arbiters are configurable by the different bus masters. This can be done "on the fly", in other words, a user program can alter the configuration according to respective needs of the system in which the device is embedded. FIG. 2 shows a table with a possible implementation in which a digital processor is associated with, for example, five bus masters such as a CPU which is the highest priority bus muster in a default mode, and a plurality of secondary bus masters such as an Ethernet unit, a USB unit, a DMA controller, and an ICD unit. This simple scheme is easily extended to add more bus masters or use less, and does not rely on a larger, potentially slower, programmable priority encoder. According to one embodiment, the system may not be a fully programmable solution because the bus master relative priority within each group may remain fixed. This can, for example, be accomplished by setting respective bits in the special function register MSTRPR 195 which is coupled with arbiters 130, 135, 140, and 145 as shown in FIG. 1.

MSTRPR register 195 may be configured as followed:
Upper Half:

| U 0 bit15 | U 0 | U 0 | U 0 | U 0 | U 0 | U 0 | U 0 bit8 |
|---|---|---|---|---|---|---|---|

Lower Half:

| U 0 | U 0 | R/W DMAC (M3) | U 0 | R/W USB (M2) | U 0 | R/W ETH (M1) | U 0 |
|---|---|---|---|---|---|---|---|
| Bit7 | | | | | | | bit0 | wherein bits 15-6 are unused and bits 6, 4, 2, and 0 are reserved. Bit 5 DMAC (M3) is used to modify the DMAC Bus Master priority relative to the CPU priority. When set to 1: The DMAC Bus master priority is raised above that of the CPU while maintaining the predetermined priority relationship to only those secondary bus masters for which the priority level also has been raised above the priority of the CPU. When set to 0: No change to the DMAC Bus Master priority. The priority of the DMAC Bus Master remains below that of the CPU and is in the predetermined relationship to all other secondary bus masters that have not been raised above the CPU. Bit 3 USB (M2) is used to modify the USB Bus Master priority relative to the CPU priority. When set to 1: The USB Bus master priority is raised above that of the CPU while maintaining the predetermined priority relationship to only those secondary bus masters for which the priority level also has been raised above the priority of the CPU. When set to 0: No change to the USB Bus Master priority. The priority of the USB Bus Master remains below that of the CPU and is in the predetermined relationship to all other secondary bus masters that have not been raised above the CPU. Bit 1 ETH (M2) is used to modify the Ethernet Bus Master priority relative to the CPU priority. When set to 1: The Ethernet Bus master priority is raised above that of the CPU while maintaining the predetermined priority relationship to only those secondary bus masters for which the priority level also has been raised above the priority of the CPU. When set to 0: No change to the Ethernet Bus Master priority. The priority of the Ethernet Bus Master remains below that of the CPU and is in the predetermined relationship to all other secondary bus masters that have not been raised above the CPU.

According to an embodiment, the default priorities at reset are set such that the CPU has the highest priority and the ICD the lowest priority. In the embodiment shown above, the priority of the ICD bus master is not assigned a bit in the MSTRPR register 195. Thus, its priority remains at the lowest level. However, in other embodiments, the priority of this device may also be raised and it may be assigned to a bit in register 195. According to an embodiment, all raised priority bus masters maintain the same priority relation ship relative to each other. According to an embodiment, all masters whose priority remains below that of the CPU maintain the same priority relationship relative to each other. Thus, the secondary bus masters can be split in two groups. The first group contains the secondary bus masters with a raised priority and the second group contains the secondary bus masters whose priority has not been raised.

As shown in FIG. 2, only certain bits are used and result in eight different configurations each having a different priority order of the respective bus masters. This relatively simple scheme allows for an easy implementation in which decoding is kept to a minimum. However, in other embodiments, other decoding schemes may apply which allow for a more assignment of priorities.

The data space arbiters 130, 135, 140, 145 prioritize concurrent requests from the bus masters (initiators) 110, 105, 115 for data space bus resources (targets) 170, 175, and 180 using a predetermined priority. The bus matrix connects the winning bus master with the requested resource. Loosing bus masters are not granted access to the requested resource and may be stalled until arbitration determines that the resource is available for them to use (a structural hazard). The arbiters that control access to the data space excluding SFR space are referred to as the read and write RAM arbiters 130 and 135. The arbiters that control access to SFR space are referred to as the read and write SFR arbiters 140 and 145. Each arbiter 130, 135, 140, 145 is parameterized to support 'n' bus masters where n=NUM-BUS-MASTERS, allowing the same leaf cell to be used for all instances. The CPU 110, DMAC 115 and ICD 105 bus masters may be present in many embodiments, thus generally NUM-BUS-MASTERS>=3 for the RAM arbiters. According to a specific embodiment, only the CPU 110 and ICD 105 may access the SFR address space, thus NUM-BUS-MASTERS=2 (always) for the SFR arbiters 140 and 145.

The data space (DS) (not including SFR address space) resources and arbiter targets may be as follows according to an embodiment. Each resource requires an arbiter.
1. DS RAM (SRAM+frontside DPSRAM) read
2. DS RAM (SRAM+frontside DPSRAM) write According to a specific embodiment as shown in FIG. 1, the DMA Controller 115 accesses DPSRAM 180 via the backside port, so can be seen as a special case. The SFR address space resources and arbiter targets may be as follows according to an embodiment. Each resource requires an arbiter.
1. SFR read
2. SFR write According to an embodiment, the lowest priority bus master is M[n−1] where n=NUM-BUS-MASTERS. For both the RAM and SFR arbiters, this may always be the ICD macro. The remaining bus master priorities are somewhat user programmable via the Bus Master Priority control register, MSTRPR as explained above.

A bus master 110, 105, 115 read will be a data read from RAM (for the RAM arbiters) 170, 175 or SFR space (for the SFR arbiters). A bus master write will be a data write to RAM (for the RAM arbiters) 170, 175 or SFR space (for the SFR arbiters). The control between the bus masters 110, 105, 115 and arbiters 130, 135, 140, 145 can be realized using a bus request/grant handshake. All bus masters 110, 105, 115 may request a bus resource 170, 175, 180 by asserting their read or write bus request signals. They will only be permitted to use the requested resource when the associated arbiter 130, 135, 140, 145 has granted access by asserting the corresponding bus grant signal.

The CPU bus master arbiter interface may be the same as all other masters. However, because it can complete both a read and a write within one bus cycle, wherein all other bus masters may either read or write for each bus transaction, the interface timing is slightly different.

Furthermore, in a low power mode, such as for example, a DOZE mode, the CPU 110 may be operating at a significantly slower clock rate than the device peripherals. In order to prevent the CPU 110 from locking out subsequent resource requests from the peripherals, wherein one CPU request cycle could encompass many peripheral cycles, the CPU 110 requests are not Q-clk based but are synchronized to the P-clks prior to presentation to the arbiters.

There may be 3 address decoders implemented according to an embodiment as shown in FIG. 1. The first address decoder 120 (SFR coarse space decoder) determines if the CPU 110 and ICD 105 read and write addresses target the SFR or RAM arbiters 130, 135, 140, 145. The second address decoder 190 (DPSRAM coarse space decoder) determines if the DMA address (read or write) is targeting the DPSRAM (backside) 180 or not. The third address decoder 160 (WY panel decoder) takes the resultant addresses from the RAM read and write arbiters and directs them to either X or Y address space.

A bus arbiter can be a block of combinatorial logic that continuously prioritizes all incoming bus requests, generates a winning grant signal, and directs the winning master address bus to the arbitrated resource. It may consist of a priority encoder and a set of multiplexers. The priority encoder examines all incoming bus requests and prioritizes them based on a programmable priority encoding as explained above. The result of this encoding is passed to the address and data multiplexers, and to a one-hot encoded grant bus that grants the bus transactions to the winning bus master. The corresponding address and data buses are selected and the winning bus master gains access to the requested resource. All other requesting bus masters are held off (stalled) until such time that the winning bus master transaction has completed.

Figure 3:
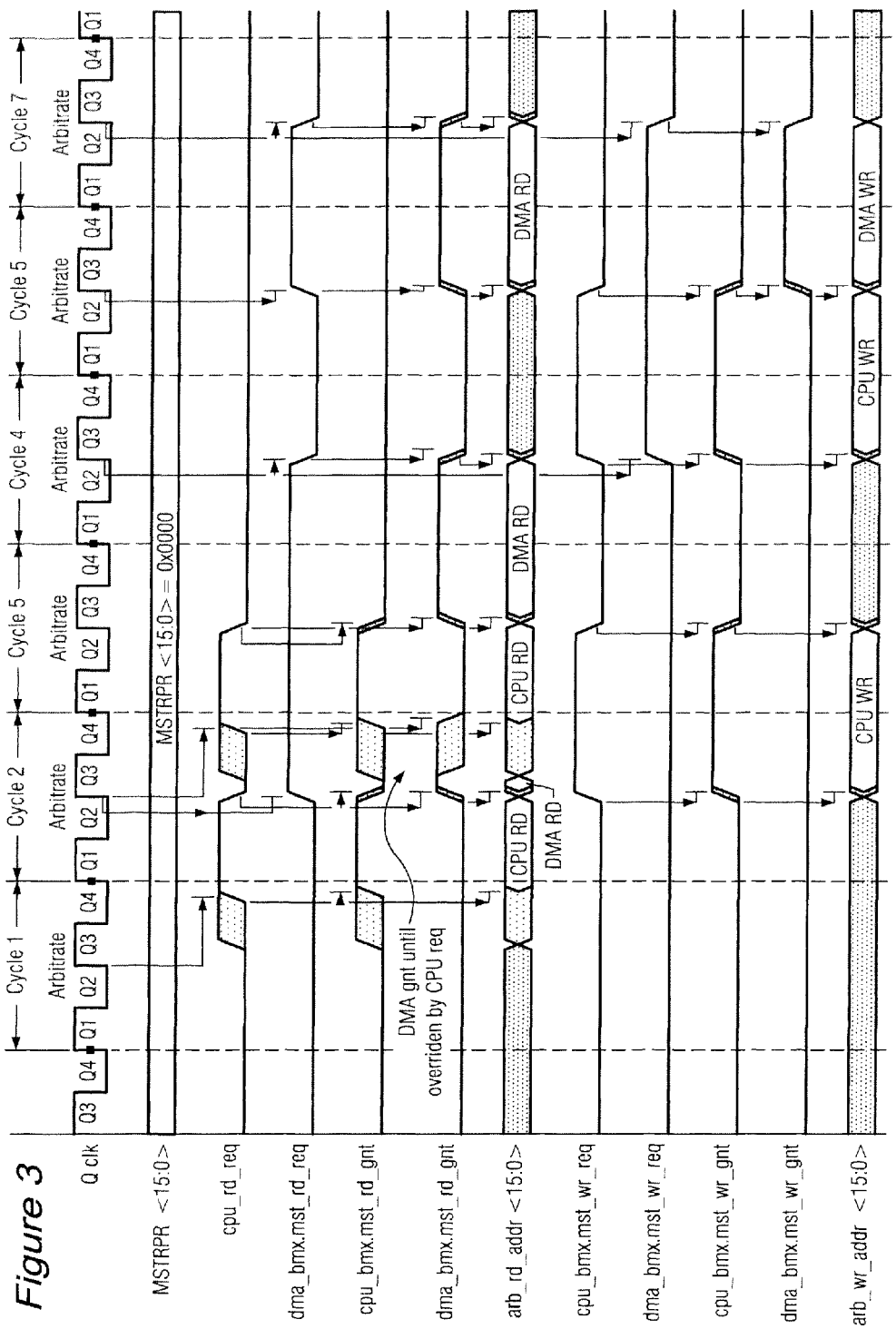
FIG. 3 shows an arbiter read block diagram according to an embodiment.
Figure 4:
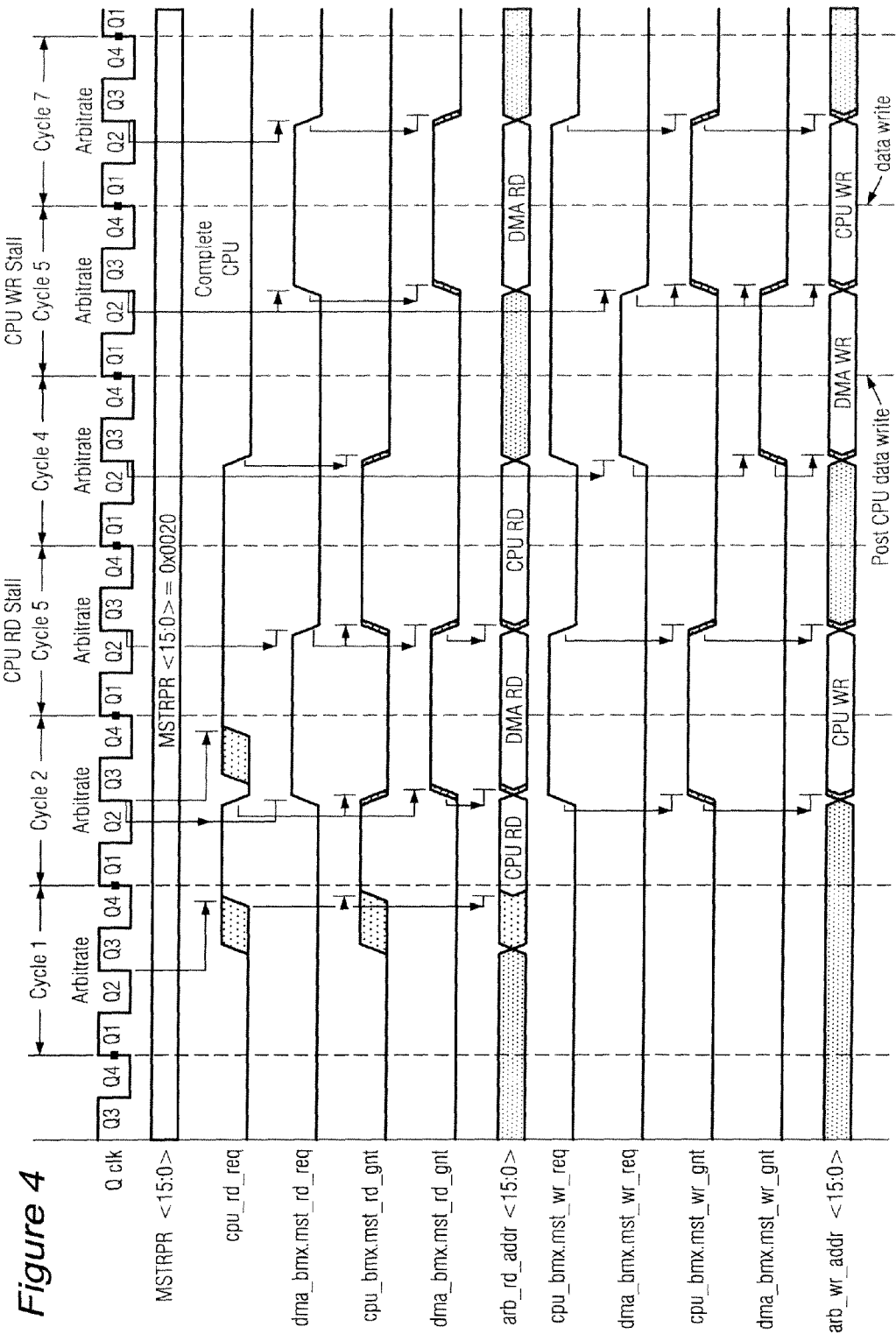
FIG. 4 shows an arbiter write block diagram according to an embodiment.

The data write arbiters 135, 145 also direct the winning master data bus to the arbitrated resource. The timing of the incoming request signals dictates the timing of the resultant grant signal, the resource address bus and (as appropriate) resource data bus. FIG. 3 shows a respective timing diagram of example transactions for the RAM arbiters 130, 135 with the CPU 110 having the highest priority. FIG. 4 shows a similar timing diagram with the CPU 110 not having the highest priority. The address multiplexer output is held in a P2 flop to keep the winning address valid beyond Q3 (CPU address can change after Q3).

Figure 5:
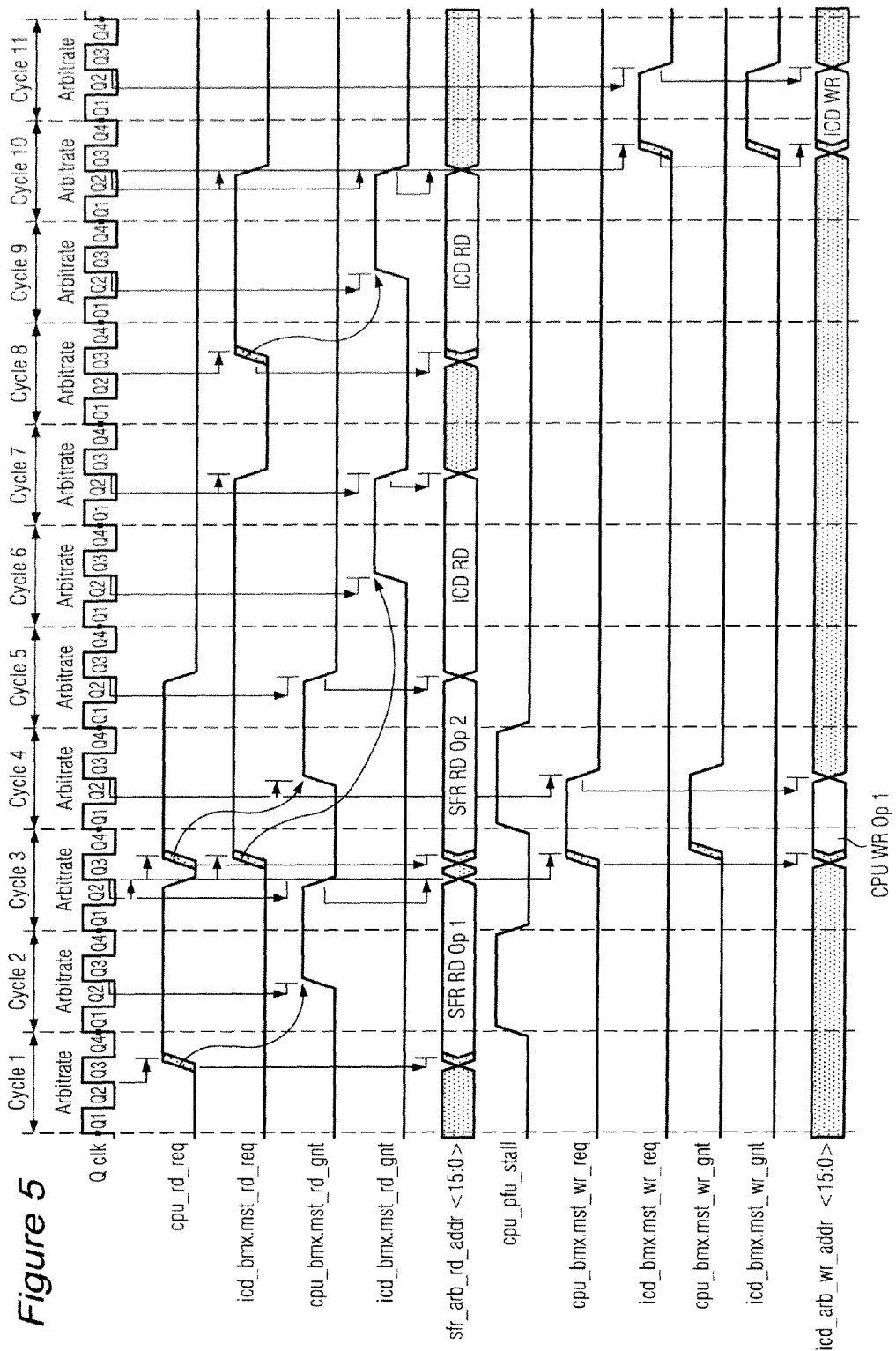
FIG. 5 shows an arbiter interconnect block diagram according to an embodiment.
Figure 6:
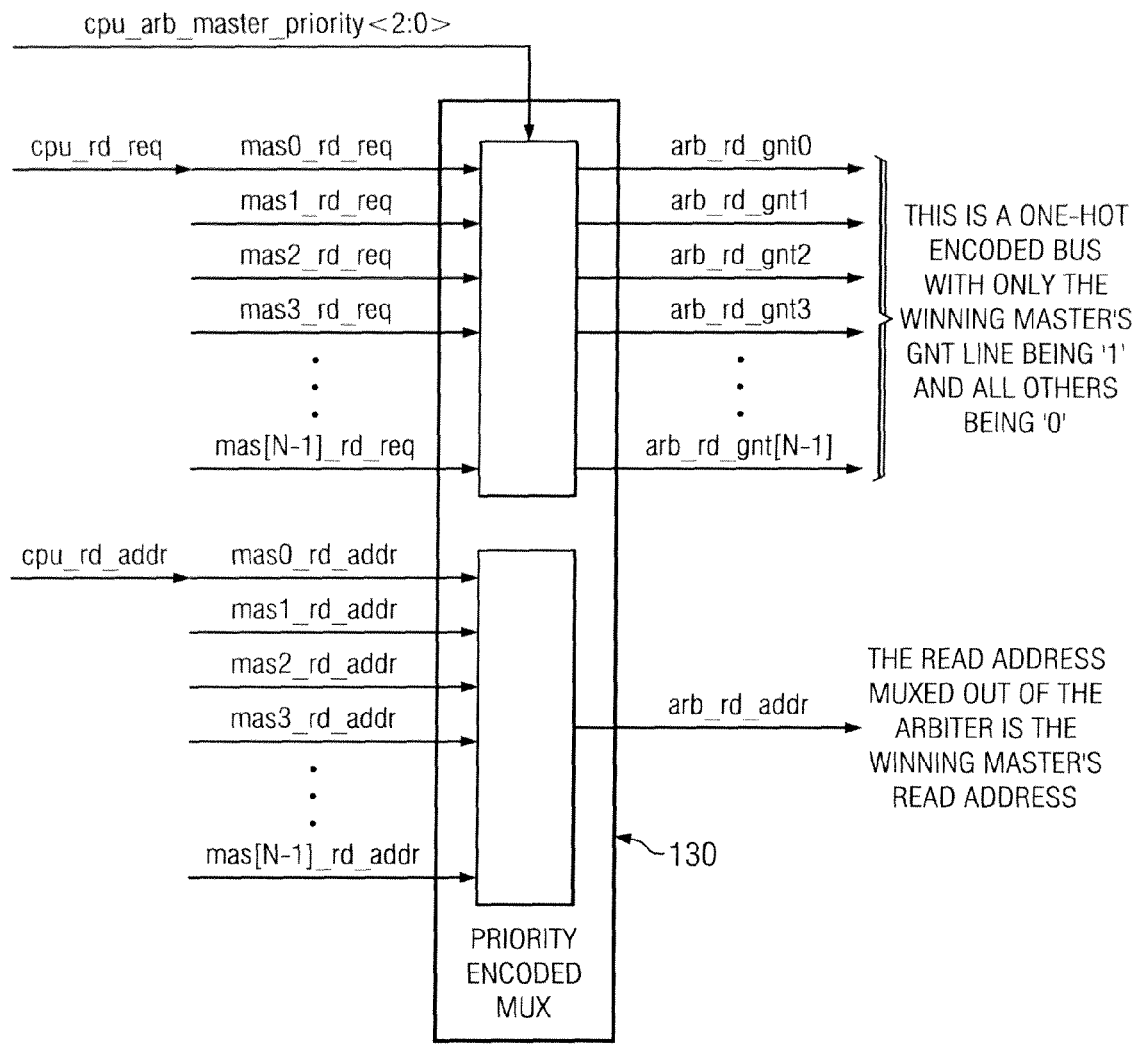
FIGS. 6 and 7 shows a RAM arbiter example truth table for four bus masters according to an embodiment.
Figure 7:
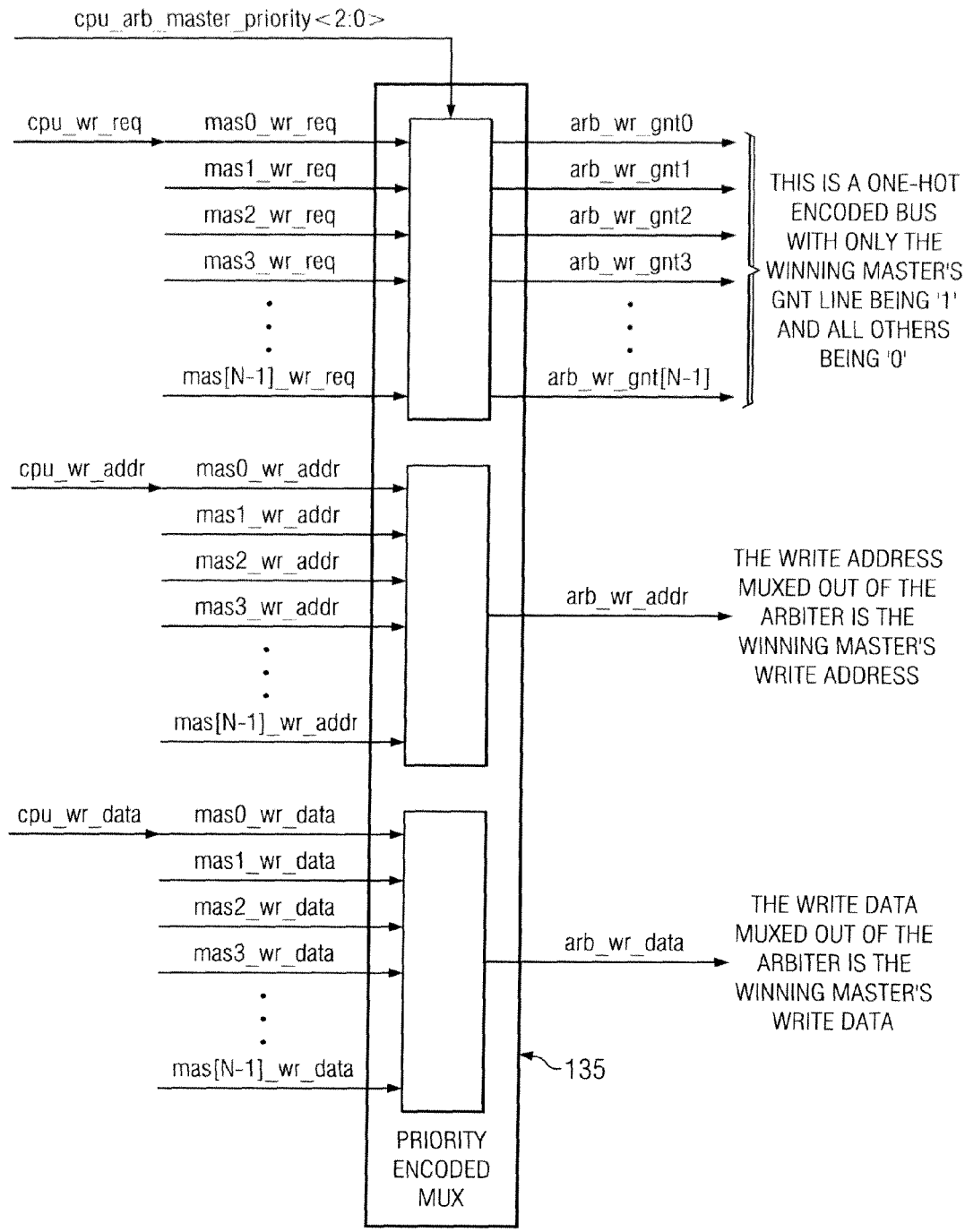

A timing diagram of example transactions for the SFR arbiters are shown in FIG. 5 wherein that CPU is always highest priority according to an embodiment. FIGS. 6 and 7 show control signals received and generated by the arbiter in read and write accesses, respectively.

The DMA controller 115, ICD 105 and all peripheral bus masters assert bus requests (xxx_bmx.mst_rd_req=1 or xxx_bmx.mst_wr_req=1, where 'xxx' represents the bus master abbreviation) on P3 if access (read or write) is required. The discussion below assumes the device is not in low power mode, where the Q-clk and Pclk frequencies can differ. For example, in a low power DOZE mode, the CPU synchronizes bus arbiter requests to the P-clks to maintain arbiter throughput for any lower priority peripheral bus masters. According to an embodiment, for CPU read requests, the CPU 110 must combinatorially pre-decode the instruction loaded into ROM-LATCH on Q3 to determine if a read request is required. A CPU read request (xcpu_bmx.mst_rd_req=1) will therefore be asserted some time after Q3. Arbitration for both read and write requests is combinatorially completed and the winning bus grant is then asserted (xcpu_bmx.mst_rd_gnt=1). A CPU Q1 latch (flop if grant timing will make Q1 setup) holds the grant result, asserting cpu_pfu_stall=1 and stalling the CPU if xcpu_bmx.mst_rd_gnt=0.

According to an embodiment, for CPU write request, the CPU 110 will assert the write request (xcpu_bmx.mst_wr_req=1) on Q3 of the active instruction cycle. For the peripheral bus masters, the arbiter grants are examined prior to P3 and if asserted, will cause the associated bus master request signal to be negated at P3. If the bus grant of a requesting peripheral bus masters is not asserted, the peripheral bus master request will remain asserted until such time that the grant is found to be asserted. The peripheral bus master will check the state of the grant signal prior to P3 of the next cycle.

According to an embodiment, for CPU reads, the read arbiter grant is examined during Q1 and if xcpu_bmx.mst_rd_gnt=1, the instruction underway is allowed to continue execution. The request, xcpu_bmx.mst_rd_req, will be negated at the next Q3. If the CPU 110 is requesting a read access and the bus master grant is not asserted (xcpu_bmx.mst_rd_gnt=0), the CPU 110 will stall the PFU (cpu_pfu_stall=0) and the CPU instruction underway (by inhibiting all register updates). The request will remain asserted until such time that the CPU is granted resource access to complete the stalled cycle.

According to an embodiment, for CPU writes, the write arbiter grant is examined prior to Q3. If xcpu_bmx.mst_wr_gnt=1, the instruction underway completes execution and the next instruction is not stalled. If the bus master grant is not asserted (xcpu_bmx.mst_wr-gnt=0), the instruction underway retires (completes execution), buffering the data write. Subsequent instructions are stalled until such time that the grant is found to be asserted. The write request remains asserted while the CPU 110 is stalled. In both cases, the CPU 110 will check the state of the grant signal prior to Q3 of the next cycle. The CPU 110 will retire (complete) the instruction underway but buffer the data write for completion at some later time (i.e. after the grant is asserted). In order to allow every instruction to complete after it is started, the CPU may be the only bus master that can buffer a data write. All other bus master requests are stalled for both read and write accesses. A winning bus master read will complete by Q3 of the cycle after the request. A winning bus master write will occur on the Q1 following the Q3 request.

According to an embodiment, bus master reads and writes can complete at a rate of one per bus cycle for the CPU 110. The CPU 110 issues the request (for either read or write) in the same cycle that it will complete it (if granted access to the requested resource.)

The data throughput for peripheral bus masters (i.e. all other bus masters except the CPU) is asymmetrical for reads and writes. Peripherals bus master read requests that occur in one cycle will (if granted resource access) complete the transaction in the next cycle. However, peripherals bus master write requests will (if granted resource access) complete the transaction in the same cycle as the request.

According to an embodiment, the bus arbiters may not be pipelined, so a peripheral bus master must complete a requested transaction before requesting another bus access. Maximum peripheral bus master data throughput is therefore one transaction every 2 cycles for reads (and one transaction every cycle for writes).

Each of the peripheral bus masters can perform either a read or a write (but not both) during an arbitrated transaction which they have won. However, according to an embodiment, read and write requests may be arbitrated separately. Consequently, a read and a write request from two bus masters can be serviced within one cycle. The CPU 110 can complete both a read and/or a write within one bus cycle. One or both of these accesses may be arbitrated.

The extended data space (EDS) Bus Master Priority Control register MSTRPR<15:0>, which may be located within the CPU 110 can be used to modify the priority of each of the peripheral bus masters relative to that of the CPU 110.

According to an embodiment, each peripheral bus master can be assigned a bit within the MSTRPR register. Bit locations for specific bus masters are fixed but 'M' numbers associated with each bus master will vary between variants, depending upon which bus masters are present. Bus masters can be added to the MSTRPR register (in fixed locations) as they are developed. According to an embodiment, the arbiter bus master inputs are always sequential (i.e. MO, MI, M2, M3 etc.) in all variants.

When the assigned bit is set, the corresponding peripheral bus master is raised to be above that of the CPU 110. The CPU priority will remain above that of the peripheral bus masters whose priority has not be raised. According to an embodiment, the relative priority of the peripheral bus masters raised above the CPU priority will remain the same as it was before being raised above the CPU 110. Similarly, the relative priority of the peripheral bus masters not raised above the CPU priority will remain the same as it was before being raised above the CPU 110. The effect of the MSTRPR register is shown in the table shown in FIG. 2 where 5 bus masters are being arbitrated.

According to an embodiment, not all devices may support Ethernet and/or USB peripherals, and the assigned relative priority of these bus masters may differ from that shown in the example.

The parameter NUM-BUS-MASTERS defines the number of bus masters supported by each of the DS/EDS RAM arbiters. According to an embodiment, a separate read and a write arbiter may be required. A RAM arbiter truth table is shown in the table depicted in FIGS. 9 and 10 for NUM-BUS_MASTERS=4, and applies to both the read and write arbiter. It arbitrates bus master access to all of DS/EDS except SFR address space.

According to an embodiment, the CPU and ICD bus masters may be always present. The remaining bus masters present in the table shown in FIGS. 9 and 10 are the USB and DMAC which are assigned to Bus Master Priority register bits MSTRPR<3> and MSTRPR<5> respectively. All other MSTRPR bits are reserved or unused and therefore 'don't care' bits.

Figure 8:
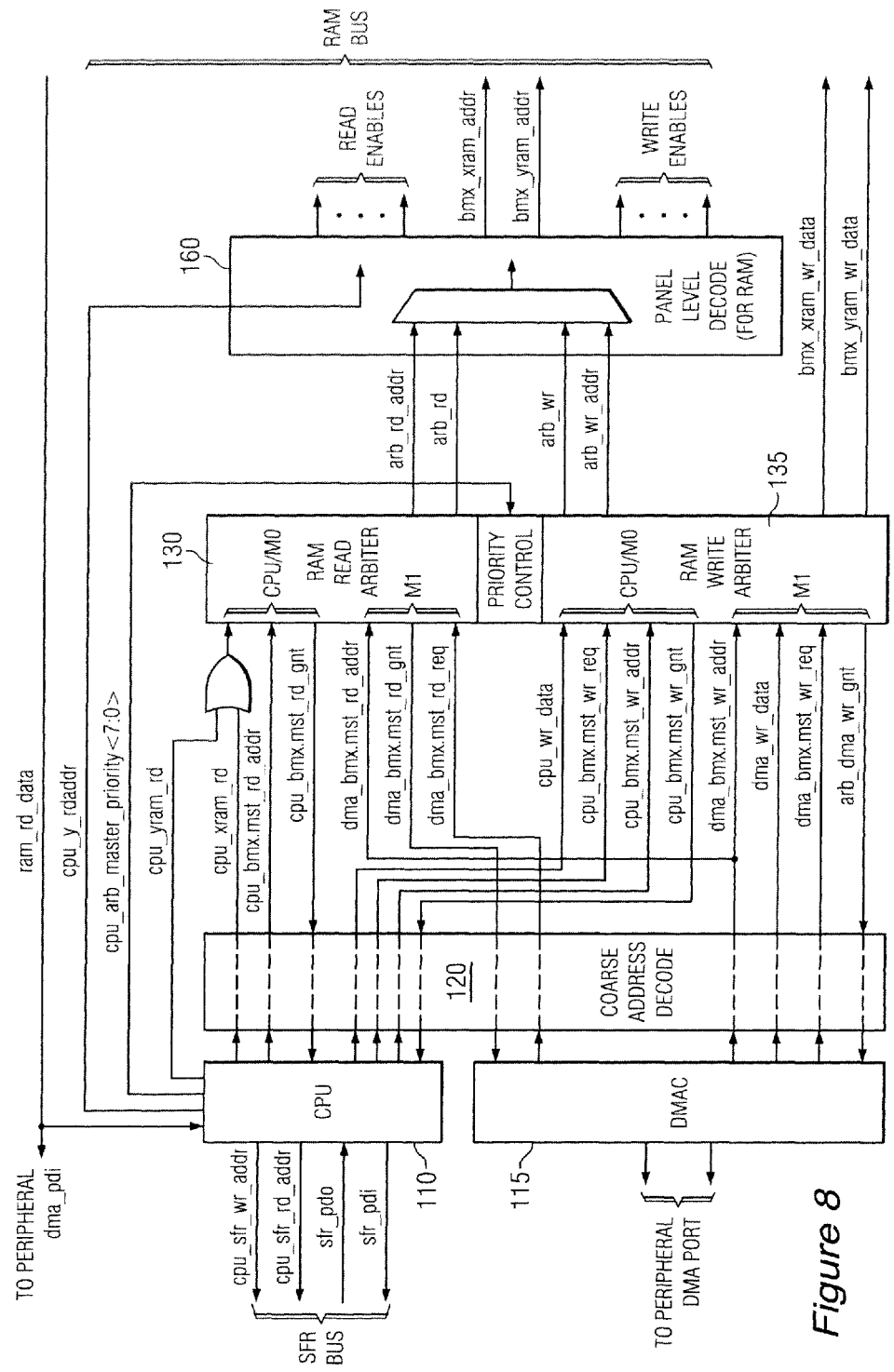
FIG. 8 shows RAM arbiters timing examples with the CPU having the highest priority.

A block diagram for the RAM arbiters and address decode block with respective signal interconnections is shown in FIG. 8. According to an embodiment, CPU 110 is always assigned to MO input of the arbiter 130 and 135. All other masters are assigned other arbiter inputs (M1, M2 etc. without gaps) in decreasing order of priority as defined by the device specification. Consequently, the same bus master may be assigned to different arbiter input ports (Mx) in different variants.

All bus masters must access DS/EDS RAM via the RAM arbiter 130, 135 (the backside DPSRAM for the DMAC is considered an exception according to an embodiment). According to an embodiment, the ICC bus master may only gain access to DS/EDS when no other master is requesting access. The ICD bus master priority can never be raised above that of any other master.

According to an embodiment, it is assumed that all peripheral bus masters will only ever transfer data to or from addresses within DS SRAM or DPSRAM (any other address would be indicative of erroneous operation). Bus requests will therefore be allowed for any bus master address. DS SRAM and DPSRAM block decode resides after the arbiter address multiplexer, so addresses outside this range will result in arbitration but will have no effect on DS memory. However, access to unimplemented DS/EDS will result in a CPU 110 illegal address trap (if the requesting bus master was the CPU 110) or a generic soft trap (if the requesting bus master was any peripheral bus master except the ICD 105). If the ICD 105 bus master attempts to access unimplemented DS/EDS, no trap will occur. The grant is issued as usual but a read will return all 0's, and a write will have no effect. The CPU 110 must send a signal to the Interrupt Controller to indicate which bus master made the request.

According to an embodiment, in a digital signal processor, the CPU X and Y RAM read requests (cpu_xram_rd and cpu_yram_rd) can be logically OR'd together to create a single CPU RAM read request (cpu_bmx.mst_rd_req) signal.

The SFR coarse address decoder 120 directs the CPU address to either the RAM arbiter 130, 135 or the SFR bus arbiter 140, 145 based on a predetermined address boundary for SFR space defined by parameter SFR_BYTE_SIZE. Bus requests associated with a CPU address that is less than the SFR limit, will be routed to the SFR arbiter 140, 145. Bus requests associated with a CPU address that is greater than or equal to the SFR limit, will be routed to the RAM arbiter 130, 135.

The output of the arbiters 130, 135, 140, 145 feeds the RAM address decoders 160 where the winning address is routed to the correct DS/EDS address space (X or Y) based on the X and Y address boundary parameters XRAM_START_ADDR, XRAM_ADDR_WIDTH and YRAM_ADDR_WIDTH. The X/Y address decoder 160 contains Q2 flops to sample and hold the RAM control signals which select the RAM data source 170, 175. According to an embodiment, X and Y RAM 170, 175 can always be located to be contiguous within the DS. For example, Y RAM 175 is placed immediately after the end of the X RAM 170 as shown in FIG. 1.

As mentioned above, a digital signal processor or microcontroller may not have to include DPSRAM. SRAM and (frontside) DPSRAM address spaces can be combined into a single DS/EDS RAM X address space for all bus masters except for the DMAC 115. Because according to an embodiment, the DMAC 115 has exclusive access to the DPSRAM backside bus, arbitration for this bus master is only required for addresses that fall outside of the DPSRAM address range (i.e. for SRAM only). Other bus masters are permitted access to the DPSRAM frontside bus while the DMAC 115 is accessing the backside bus. The DPSRAM 180 may include logic to detect and flag inadvertent concurrent writes to the same DPSRAM address from both ports.

The DPSRAM 180 may be located at the same address for both frontside and backside accesses. The DPSRAM coarse address decoder 190 examines both read and write data requests from the DMAC 115 and determines if they target DPSRAM address space or not. If a DPSRAM access is detected, the corresponding read or write request is routed directly to the DPSRAM 180 and not to the RAM arbiters 130, 135, 140, 145. The DPSRAM coarse address decoder 190 must also immediately issue a bus grant to the DMAC 115 in order to allow the access to the backside DPSRAM port to complete. In effect, the arbiter can be viewed as ignoring this request and may grant another bus master access to DS/EDS, including access to DPSRAM 180 via the frontside bus.

According to an embodiment, the SFR arbiter 140, 145 may only support 2 bus masters, CPU 110 and ICD 105, so NUM-BUS-MASTER=2 (fixed). The CPU 110 will always win any arbitration, irrespective of the state of the state of cpu_arb_master_priority<7:0> because the ICD 105 is always at the lowest priority (and cannot cycle steal).

The resultant output of the SFR arbiters 140, 145 will be the winning bus master address, data and read (or write) signal. In order to meet timing for certain peripherals, the winning read address is held in a P2 flop. Peripheral address decode is completed within each peripheral.

According to an embodiment, in order to meet device speed objectives, all SFR bus grants in response to SFR read requests (with the exception of memory mapped CPU register SFR addresses as will be explained in more detail below) are pipelined to delay them by one cycle. SFR read accesses will result in a CPU stall and are therefore 2 cycle operations.

Memory mapped CPU registers can reside within SFR address space. However, these registers physically reside within the CPU 110. All SFR write requests are granted immediately (subject to successful arbitration), allowing SFR writes to be completed in 1 cycle.

Figure 11:
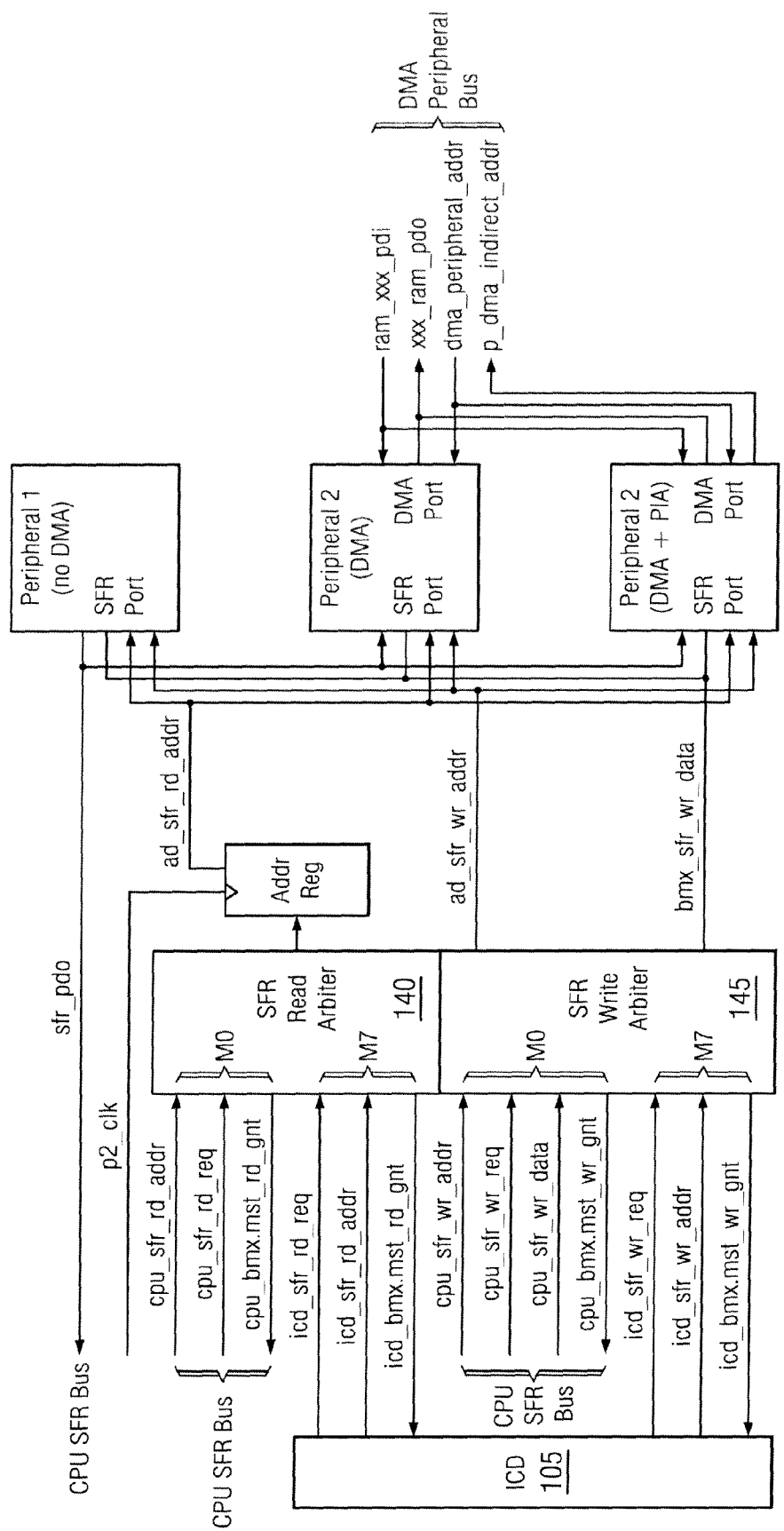
FIG. 11 shows SFR arbiters timing examples with the CPU having the highest priority.

A block diagram for the SFR arbiters and address decode block is shown in FIG. 11. A timing diagram of example transactions for the SFR arbiters are shown in FIG. 5 (CPU is always highest priority).

According to an embodiment, the ICD 105 can read or write any SFR but writes to CPU SFRs are inhibited through ICD firmware. Furthermore, if any code protection is enabled, all ICD SFR accesses are inhibited by the ICD macro According to an embodiment, a CPU trap that disables CPU writes to SFR space (cpu_disable_memwrite=1) should not interfere with any coincident ICD SFR write requests No system clocks are active in a low power SLEEP mode, so all arbiters 130, 135, 140, 145 are inactive. In an IDLE mode, the CPU Q-clks are disabled while the peripheral P-clks remain active. Consequently, according to an embodiment, the CPU 110 cannot make any arbiter bus requests while in IDLE mode. Because all peripheral bus masters (including the ICD macro) operate using P-clks, both the RAM and SFR bus arbiters 130, 135, 140, 145 continue to operate as normal for these bus masters in IDLE mode.

According to an embodiment, in another low power DOZE mode, the CPU Q-clks run at a (programmable) binary fraction of the peripheral P-clks. As mentioned above, all peripheral bus masters run using the P-clks. Consequently, the CPU 110 must postpone all arbiter bus requests until the last (P-clk) cycle of each Q-clk cycle. Failure to do so would result in the CPU 110 monopolizing the bus arbiter, blocking all lower priority bus masters for the duration of each CPU cycle that requires bus access.

Wile embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A digital processor, comprising:
a data space arbiter comprising more than two fixed bus access priority schemes, wherein each priority scheme assigns a priority level to a plurality of devices for bus access, wherein in a default priority scheme of said plurality of priority schemes a default bus master has a highest priority level and a priority order of secondary bus masters in said default, priority scheme defines a default, priority order, wherein the data space arbiter grants bus access according to a priority scheme selected from said plurality of priority schemes;
wherein in each non-default priority scheme a priority level of at least one of said secondary bus masters is raised to have a priority level higher than the priority level of the default bus master while a priority level order of remaining secondary bus masters remains unchanged, wherein in each non-default priority scheme with more than one of said secondary bus masters having a priority level higher than the priority level of the default bus master the default priority order for those secondary bus masters for which the priority level has been raised above the priority level of the default bus master is maintained.

2. The digital processor according to claim 1, wherein the data space arbiter grants access to data memory and wherein the data memory comprises at least one of random access memory, dual port memory, and special function registers.

3. The digital processor according to claim 1, wherein the data space arbiter comprises a separate arbiter unit for read and write accesses.

4. The digital processor according to claim 1, wherein the data space arbiter comprises a separate arbiter unit for memory and special function register accesses.

5. The digital processor according to claim 3, wherein the data space arbiter comprises a separate arbiter unit for memory and special function register accesses.

6. The digital processor according to claim 2, further comprising an address decoder coupled between the data space arbiter and the data memory.

7. The digital processor according to claim 1, further comprising a coarse address decoder coupled between the data space arbiter and the default bus master or secondary bus masters.

8. The digital processor according to claim 2, wherein the digital processor is a digital signal processor and the random access memory is split into an X-memory and a Y-memory.

9. The digital processor according to claim 1, wherein the default bus master is a central processing unit (CPU).

10. The digital processor according to claim 1, further comprising a bus master priority register configured to select one of the priority schemes, and wherein the bus master priority register comprises a plurality of bits, at least one of said secondary bus masters is assigned to one of said bits, wherein setting of at least one bit selects one of said non-default priority schemes and wherein each bit that has been set specifies which ones of the plurality of secondary bus masters have a higher priority level than the default bus master priority level.

11. A method for arbitrating data space access in a digital processor, comprising:
providing more than two fixed bus access priority schemes, wherein each priority scheme assigns a priority level to a plurality of devices for bus access, wherein only in a default priority scheme of said plurality of priority schemes a default bus master has a highest priority level and a priority order of secondary bus masters in said default priority scheme defines a default priority order, wherein in each non-default priority scheme a priority level of at least one of said secondary bus masters is raised to have a priority level higher than the priority level of the default bus master while a priority level order of remaining secondary bus masters remains unchanged, wherein in each non-default priority scheme with more than one of said secondary bus masters having a priority level higher than the priority level of the default bus master the default priority order for those secondary bus masters for which the priority level has been raised above the priority level of the default bus master is maintained;
programming a data space arbiter in a non-default mode to select one of said plurality of priority scheme; and performing a data space arbitration for granting a bus access according to the selected priority scheme.

12. The method according to claim 11, further comprising: requesting access to a data space by a secondary bus master while said default bus master has access to said data space and if the priority level of the secondary bus master is higher than the priority level of the default bus master, granting access to the data space other wise stalling the secondary bus master.

13. The method according to claim 11, wherein the data space is data memory which comprises at least one of random access memory, dual port memory, and special function registers.

14. The method according to claim 11, wherein the data space arbiter comprises a separate arbiter unit for read and write accesses.

15. The method according to claim 11, wherein the data space arbiter comprises a separate arbiter unit for memory and special function register accesses.

16. The method according to claim 14, wherein the data space arbiter comprises a separate arbiter unit for memory and special function register accesses.

17. A method according to claim 11, wherein said step of programming a data space arbiter to raise a priority level of said secondary bus masters comprises the step of setting at least one bit in a bus master priority register, and wherein at least one of said secondary bus master has an associated bit in said bus master priority register.

18. A method for arbitrating data space access in a digital processor, comprising:
providing a default priority scheme and a plurality of secondary priority schemes each defining a fixed bus access priority order and each priority scheme being selectable through a control register, wherein each priority scheme assigns a priority level to a plurality of devices for bus access, wherein only in a default priority scheme of said plurality of priority schemes a central processing unit (CPU) has a highest priority level and a priority order of secondary bus masters in said default priority scheme defines a default priority order, wherein in each non-default priority scheme a priority level of at least one of said secondary bus masters is raised to have a priority level higher than the priority level of the CPU while a priority level order of remaining secondary bus masters remains unchanged, wherein in each non-default priority scheme with more than one of said secondary bus masters having a priority level higher than the priority level of the CPU the default priority order for those secondary bus masters for which the priority level has been raised above the priority level of the default bus master is maintained;
programming the control register of a data space arbiter in a non-default mode to select one of said plurality of priority scheme; and
performing a data space arbitration for granting a bus access according to the selected priority scheme.

19. A digital processor, comprising:
a selection register operable to select one of a default priority scheme and a plurality of secondary priority schemes, each having a fixed priority order;
a default bus master having a highest priority level only when the default priority scheme is selected;
a plurality of secondary bus masters having associated priority levels according to a selected priority scheme, wherein the default priority scheme defines a default priority order of said plurality of secondary bus masters; and
a data space arbiter, wherein the data space arbiter is programmable through said selection register to select one of said plurality of secondary priority schemes, wherein in each of said secondary priority schemes that can be selected, a priority level of at least one of said secondary bus masters is raised to have a priority level higher than the priority level of the default bus master while a priority level order or remaining secondary bus masters remains unchanged, wherein whenever the priority level of a secondary bus master is raised above the level of the default bus master, a priority order of only those secondary bus masters for which the priority level also has been raised above the priority level of the default bus master is maintained according to said default priority order.

20. The digital processor according to claim 19, wherein the digital processor is configured to set at least one bit of said selection register to select a priority scheme, wherein setting of at least one bit selects one of said secondary priority schemes and wherein each bit that has been set specifies which ones of the plurality of secondary bus masters have a higher priority level than the default bus master priority level.

21. The method according to claim 18, wherein the step of programming the control register comprises setting at least one bit of said control register, wherein setting of at least one bit selects one of said secondary priority schemes and wherein each bit that has been set specifies which ones of the plurality of secondary bus masters have a higher priority level than the default bus master priority level.

* * * * *